United States Patent
Jang et al.

(10) Patent No.: US 10,003,773 B2
(45) Date of Patent: Jun. 19, 2018

(54) SHOCK SENSING DEVICE FOR VEHICLE AND METHOD FOR CONTROLLING THEREOF

(71) Applicant: INDUSTRY ACADEMIC COOPERATION FOUNDATION OF YUENGNAM UNIVERSITY, Gyeongsan-si, Gyeongsangbuk-do (KR)

(72) Inventors: Dal Hyun Jang, Gyeongsan-si (KR); Seung Hwan Lee, Gyeongsan-si (KR); Young Tak Kim, Gyeongsan-si (KR); Sang Woon Suh, Gyeongsan-si (KR); Ho Youl Jung, Gyeongsan-si (KR); Chang Hyeon Park, Gyeongsan-si (KR)

(73) Assignee: INDUSTRY ACADEMIC COOPERATION FOUNDATION OF YEUNGNAM UNIVERSITY, Gyeongsangbuk-Do (KR)

( * ) Notice: Subject to any disclaimer, the term of this patent is extended or adjusted under 35 U.S.C. 154(b) by 185 days.

(21) Appl. No.: 14/422,063

(22) PCT Filed: Aug. 16, 2013

(86) PCT No.: PCT/KR2013/007385
§ 371 (c)(1),
(2) Date: Feb. 17, 2015

(87) PCT Pub. No.: WO2014/027858
PCT Pub. Date: Feb. 20, 2014

(65) Prior Publication Data
US 2015/0244994 A1    Aug. 27, 2015

(30) Foreign Application Priority Data
Aug. 17, 2012    (KR) .......................... 10-2012-0090293

(51) Int. Cl.
*B60R 21/01*    (2006.01)
*H04N 7/18*    (2006.01)
(Continued)

(52) U.S. Cl.
CPC .............. *H04N 7/188* (2013.01); *B60R 1/00* (2013.01); *B60R 1/002* (2013.01);
(Continued)

(58) Field of Classification Search
CPC ... B60Q 1/1463; B62D 41/00; H04N 13/0203
(Continued)

(56) References Cited

U.S. PATENT DOCUMENTS

2002/0116106 A1*  8/2002  Breed ................... B60N 2/002
                                                                                701/45
2010/0214791 A1*  8/2010  Schofield ............. B60Q 1/1423
                                                                                362/466

FOREIGN PATENT DOCUMENTS

JP      2010-272067 A    12/2010
KR   10-2010-0064628 A   6/2010
KR      10-0983777 B1    9/2010

OTHER PUBLICATIONS

Notice of Preliminary Rejection issued in corresponding Korean Patent Application No. 10-2012-0090293, dated Oct. 17, 2013, to which the present application claims priority.
(Continued)

*Primary Examiner* — Sathyanaraya V Perungavoor
*Assistant Examiner* — Patricia I Young
(74) *Attorney, Agent, or Firm* — Porzio Bromberg & Newman P.C.

(57) ABSTRACT

The present invention relates to a shock sensing device for vehicle and method for controlling thereof. The present invention can minimize battery consumption with faster handling of occurred accident more than prior art when
(Continued)

camera was installed at a side of a vehicle to film a blind spot since the present invention can film information of a vehicle blind spot with camera of only 1 channel or 2 channel.

2 Claims, 2 Drawing Sheets

(51) Int. Cl.
*G06K 9/00* (2006.01)
*B60R 1/00* (2006.01)
*H04N 5/232* (2006.01)
*H04N 5/77* (2006.01)
*H04N 5/907* (2006.01)

(52) U.S. Cl.
CPC ..... *G06K 9/00805* (2013.01); *G06K 9/00825* (2013.01); *H04N 5/232* (2013.01); *H04N 5/23296* (2013.01); *H04N 5/772* (2013.01); *H04N 5/907* (2013.01); *B60R 2300/101* (2013.01); *B60R 2300/102* (2013.01); *B60R 2300/307* (2013.01); *B60R 2300/404* (2013.01); *B60R 2300/50* (2013.01); *B60R 2300/8073* (2013.01)

(58) Field of Classification Search
USPC .......................................................... 347/148
See application file for complete search history.

(56) References Cited

OTHER PUBLICATIONS

Notice of Allowance issued in corresponding Korean Patent Application No. 10-2012-0090293, dated Dec. 30, 2013, to which the present application claims priority.

\* cited by examiner

SHOCK SENSING DEVICE FOR VEHICLE AND METHOD FOR CONTROLLING THEREOF

CROSS-REFERENCE TO RELATED APPLICATIONS

This application claims priority from Korean Patent Application No. 10-2012-0090293, filed on Aug. 17, 2012, in the Korean Intellectual Property Office, the disclosure of which is incorporated herein by reference in its entirety.

BACKGROUND

1. Field of the Invention

The present invention relates to a shock sensing device for vehicle and more uniticularly a shock sensing device for vehicle and method for controlling thereof wherein records and transmits crash information to a user by rotating a camera to a range crashed vehicle is recognizable based on information of a headlight or taillight of a vehicle when vehicle crash is detected.

2. Description of the Related Art

Finding cause of a traffic accident such as minor collision is mainly based on witness testimony or police officer's empirical judgment of a however, such method is subjective thereby, a problem of confusion between offender and victim occurs since culpability is uncertain.

Thus, need of shock sensing device for vehicle control device and vehicular black box which can accurately analyze cause of accident and recognize vehicle condition at the time of accident in a case of traffic accident or theft case is gradually increasing. Recently introduction of a system of black boxes to be compulsory for vehicle is being promoted. Hereinafter, shock sensing device for vehicle will be referred to as 'vehicular black box' or 'black box.'

Such vehicular black box provides various input channels such as 1 channel, 2 channel, and 4 channel. Most of the vehicular black boxes are single channels wherein films front of a vehicle with one camera and in some cases plural channels are preferred to record front, back, both sides and inside of a vehicle.

However, problem is limited filming range regardless of single or plural channels. This is because vehicular black box camera is fixed thereby, blind spot where camera cannot film exists.

As aforementioned, function of securing evidence to flexibly handle accident is most important. However, blind spot would decrease block box efficiency and consequently would reduce the need to equip a vehicular black box.

Of course, a plurality of black boxes can be installed to film front, back and side of a vehicle. However, when more than 2 channels of black box are installed user's cost would increase. Moreover, battery consumption would also greatly increase leading to battery loss than using 1 channel or 2 channel of a black box. In this case, if vehicle is parked for a long time, starting engine would be a problem.

A black box comprises 'normal recording' which records all section of vehicle drive and 'shock recording' which only records when a vehicle receives shock, thereby, a driver was able to promptly handle accidents occurred while driving.

However, promptly handling accidents occurred during night parking was still difficult. Of course, black box supporting recording function which is constantly on came out but filming range was limited because camera was fixed as aforementioned. In night parking situation, black box recording is sole evidence but vehicle which caused the accident could not be recorded due to such limited recording range.

Further, when only 1 channel or 2 channel black boxes were used to solve the problem of battery loss, there is no way to record crashes such as minor accidents occurred at side of a vehicle. Accordingly, there is need for a method to film a vehicle involved in accidents occurred in a blind spot.

Moreover, recording of a black box of prior art could be seen only through a computer PC with medium such as a USB memory card or a flash memory of a black box or video image. Thus, crash accident occurred without a driver in a parked or stopped vehicle, could only be checked by a driver after the accident.

SUMMARY

Exemplary embodiments of the present inventive concept overcome the above disadvantages and other disadvantages not described above. Also, the present inventive concept is not required to overcome the disadvantages described above, and an exemplary embodiment of the present inventive concept may not overcome any of the problems described above.

An object of the present invention is to solve the above problem by enabling easy record of information relating to a crash accident occurred in a vehicle blind spot with only 1 channel or 2 channel cameras.

Another object of the present invention is to provide information of crash accident occurred in a vehicle blind spot to an external terminal device.

According to features of the present invention to accomplish the objects, shock sensing device for vehicle comprising, at least one shock sensing sensor installed in a vehicle, at least one camera wherein rotates to a predetermined direction when shock sensing signal is generated from the shock sensing sensor, an image processing unit wherein recognizes front and back direction of a crashed vehicle and crash point where crash occurred based on image information collected from the rotating camera and, a control unit wherein senses filming direction of the camera and stops the camera when the camera's filming direction is directed and controls to store image information regarding crash vehicle.

Image information collected form the camera includes information of RGB value corresponding with brightness of a front light of a vehicle or RGB value corresponding with red color of a tail light of a vehicle and, the image processing unit determines the crash point and front and back direction of the crash vehicle using information of RGB value corresponding with brightness of a front light of a vehicle or RGB value corresponding with red color of a tail light of a vehicle.

When a plurality of the shock sensing sensor is installed, crash point is divided into front, center and back of a vehicle according to a shock sensing sensor wherein outputs shock sensing signal, and the control unit controls at least one camera between front camera and back camera to rotate according to the crash point.

Further the present invention is characterized by further including a communication unit wherein transmits image information relating to crash vehicle filmed by the camera and, a manual operating unit wherein films image information of a crash vehicle with direct button input.

According to other features of the present invention, a shock sensing control method for a vehicle including a rotating step wherein a control unit rotating at least one camera installed in a vehicle when a vehicle crash is detected, a recognition step wherein image information collected from the rotating camera is recognized based on a crash point wherein crash occurred, a recording step wherein the control unit stops the camera rotating and films a crash vehicle when the crash point is recognized, and a transmitting step wherein image information recorded or filmed with the camera is transmitted to an external terminal device through a communication unit.

The recognition step herein detects RGB value which corresponds with a front light or a tail light of the crash vehicle at night.

Further in the recognition step front and back direction of the crash vehicle is determined according to the RGB value and recognize the crash vehicle as a forwarding vehicle when RGB value of the head light is detected and recognize the crash vehicle as a reversing vehicle when RGB value of a tail light is detected.

Further, the recording step stops the camera rotating and stores image until the detected RGV value is not detected anymore when the front light or back light is detected.

Moreover, the recording step is processed from a point wherein a stopped camera or a camera rotating again detects headlight or tail light of the crash vehicle and recognizes as a crash vehicle to a point a crash vehicle is not in a range of vision.

According to the present invention with such features, when crash accident occurs at a side of a stopped or a parked vehicle, at least one camera is rotated and filming crash accident information and can accurately recognize information of a crash vehicle related to the crash accident using information of a head light or a tail light of a crash vehicle. Thus, problem of prior art in regards to failing to record a crash vehicle despite of crash accident occurred at a vehicle blind spot was solved.

Further, the present invention can minimize battery consumption more than prior art when camera was also installed at a side of a vehicle to film a blind spot since the present invention can film information of a vehicle blind spot with a minimal number of cameras.

Further, immediately after crash accident the present invention wirelessly transmits information to a crash accident wherein a camera films with an external terminal device such as a smartphone, thereby a driver can immediately comprehend a crash accident thereby can flexibly cope with an accident.

BRIEF DESCRIPTION OF THE DRAWINGS

The foregoing and other features and advantages of the inventive concepts will be apparent from the more particular description of preferred embodiments of the inventive concepts, as illustrated in the accompanying drawings in which like reference characters refer to the same units throughout the different views. The drawings are not necessarily to scale, emphasis instead being placed upon illustrating the principles of the inventive concepts. In the drawings.

DETAILED DESCRIPTION OF EXEMPLARY EMBODIMENTS

Figure 1:
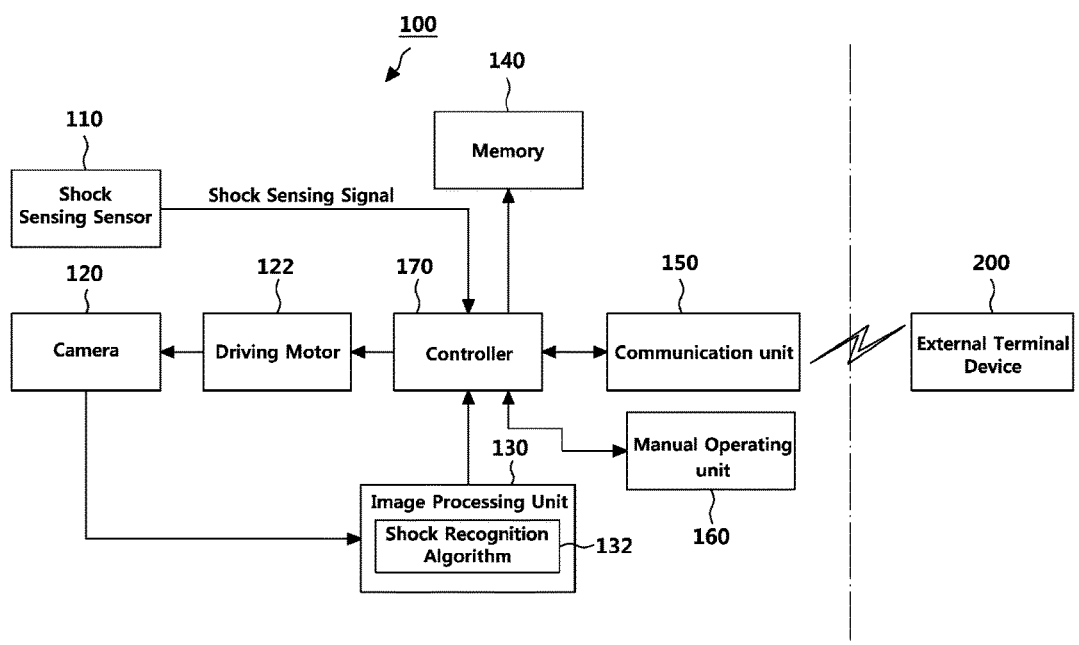
FIG. 1 is diagram illustrating a shock sensing control device for vehicle according to the embodiment of the present invention.

Certain exemplary embodiments of the present inventive concept will now be described in greater detail with reference to the accompanying drawings.

In the following description, same drawing reference numerals are used for the same elements even in different drawings. The matters defined in the description, such as detailed construction and elements, are provided to assist in a comprehensive understanding of the present inventive concept. Accordingly, it is apparent that the exemplary embodiments of the present inventive concept can be carried out without those specifically defined matters. Also, well-known functions or constructions are not described in detail since they would obscure the invention with unnecessary detail.

While the expressions such as "first" or "second" can be used to refer to various elements, the elements are not limited by the expressions. The expressions are used only for the purpose of distinguishing one element from the other.

The expressions are used herein only for the purpose of explaining specific embodiments and not to limit the present invention. An expression in singular form encompasses plural meaning, unless otherwise specified. Throughout the description, the expression "comprise" or "have" is used only to designate the existence of characteristic, number, step, operation, element, component or a combination thereof which are described herein, but not to preclude possibility of existence of one or more of the other characteristics, numbers, steps, operations, elements, components or combinations of these or addition.

Hereinafter, the embodiment according to the present invention of a shock sensing control device for vehicle and control method thereof is explained in detail referring to the attached drawing FIG. 1 is a diagram illustrating a shock sensing control device for vehicle according to the embodiment of the present invention.

A black box 100 which is a shock sensing control device for vehicle is installed with a shock sensing sensor 110 wherein senses whether a vehicle is crashed or not. A shock sensing sensor 110 senses vehicle crash or shaking condition with shock similar to the crash and a shock sensing sensor 110 herein is designed to output shock sensing signal only at exceeded predetermined reference value. Such shock sensing sensor 110 can be installed in at least one unit of a vehicle such as in front, back and side of a vehicle. A shock sensing sensor 110 can be installed considering whole length and width of a vehicle to accurately recognize a crash point. Herein, rotating operation of a camera can be selectively driven among after-mentioned cameras. However, camera can be installed in only one place of a vehicle because only shaking condition of a vehicle needs to be sensed in the embodiment. Likewise, there is an advantage of saving purchase and installation cost of a sensor since only one shock sensing sensor 110 can be used. Obviously, a shock sensing sensor 110 can be installed in the black box 100.

A camera is installed in a black box 100. In case shock is sensed at a vehicle a camera 120 starts to rotate to one direction and films a crash vehicle (i.e. vehicle involved in a crash accident) at a condition stopped under after-mentioned shock recognition algorithm. A camera 120 has a rotating structure to rotate to one direction. Rotation drive power of a camera is provided by a driving motor 122. Step motor is used as an example of a driving motor 122. When a camera 120 is installed in a black box 100, several gear structures are provided in a camera and directions of camera 120 can be left, right, up and down according to a driving power of a driving motor. If, a camera 120 is installed outside of a black box 100, a camera 120 comprised in an extra housing and can be rotated left, right, up and down in accordance with a driving power of a driving motor. Herein, camera 120 rotating structure is already known in related technical field thus, an explanation on rotating structure of a camera 120 will be omitted.

The present invention is with reference to a 1 channel camera wherein installed in front of a vehicle however, for convenient explanation, the embodiment of the present invention takes 2 channel structure wherein a camera 120 is installed in both front and back of a vehicle as an example. Herein, whether it is 1 channel or 2 channel, recording process of a camera recognizing crash vehicle is identically applied.

Hereinafter, a camera of 2 channel structure installed in front of a vehicle is denominated as a 'front camera' and a camera installed in back of a vehicle is denominated as a 'back' camera. At least one of the front camera and the back camera is operated with reference to a crash point of a crash vehicle.

A black box 100 comprises an image processing unit 130 to stop a camera 120 which rotates promptly after a crash vehicle is sensed. An image processing unit 130 outputs a signal to recognize a crash vehicle and stops a camera rotating with a crash recognition algorithm 132.

The shock recognition algorithm 132 recognizes crash vehicle according to following condition. Herein, the embodiment of the present invention is characterized by obtaining information relating to a crash object when crash occurs to a stopped or a parked vehicle. Thus, the condition will be explained by recognizing a crash vehicle in regards to a stopped or a parked vehicle in day and night.

Shock sensing in a parked and a stopped condition at night

Normally a head light and a tail light of a vehicle are on during driving at night. Therefore, when crash accident occurs, method recognizing crash vehicle by rotating a camera until a head light or a tail light of a crash vehicle is detected is provided. Obviously, if the head light or tail light or other lamps are allowed to be on during night drive according to the Road Traffic Act, recognizing crash vehicle using such lamp light should also be included.

Further, when crash vehicle is recognized with a headlight of a vehicle, RGB value of a headlight is recognized and crash vehicle is recognized with whether there is a pixel with or without RGB value. A crash occurred when headlight is recognized can be determined as a crash caused by a forwarding vehicle. Moreover, when recognizing crash vehicle with a tail light of a vehicle, since back light normally uses red light lamp, recognizes crash vehicle with pixel of red RGB value. When tail light is recognized, occurred crash can be determined to be caused by a reversing vehicle.

According to such recognition process, rotating camera 120 will stop to film a crash vehicle.

Shock sensing of a parked and a stopped vehicle at day

The head light or the tail light is not on during day driving.

Accordingly, when crash of a vehicle is sensing during day, a camera 120 would recognize a vehicle as a crash vehicle. In other words, a camera 120 would rotatate and stop rotating when another vehicle is detected.

On the other hand, a black box 100 comprises memory 140. Memory 140 is a medium wherein information relating to crash vehicle recorded by a camera 120 is stored. Information stored includes information of a compressed video clip or a static image of a steel cut.

Moreover, a black box 100 comprises a communication unit 150 wherein can transmit information of a crash vehicle stored in a memory 140 to an external terminal device 200 such as smart phone or to a server of a relevant institution such as a police station. Communication unit 150 can support various communication method such as Radio Local Area Network (hereinafter mentioned as RLAN), CDMA method and RFID method and so on.

Further, a black box 100 can comprise manual operating unit 160 wherein a driver or a passenger of a vehicle can directly record other vehicles in crash occurrence situation. Manual operating unit 160 comprises various buttons such as rotate/stop/film/return for rotate, stop and record of a camera 120. Some buttons can be one-touch button wherein functions such as rotate, stop, film, return proceed by order.

Moreover, the present invention comprises a control unit 170 controlling aforementioned features such as a shock sensing sensor 110, a camera 120, an image processing unit 130, communication unit 150. In other words, a control unit 170 performs operation of rotating and stops driving of a camera 120 according to a shock sensing signal and a camera rotating stop signal wherein transmitted from a shock sensing sensor 110 and image processing unit 130. Particularly, in case a plurality of shock sensing sensor 110 is installed, a control unit 170 controls at least one of front or back camera in reference to a point where crash accident occurred. For example, a control unit controls wherein a front camera rotates when crash occurs on a front side of a vehicle and a back camera rotates when crash occurs on a back side of a vehicle, and front and back cameras rotate when crash occurs at a center of a vehicle. Moreover, a control unit 170 compress and stores recorded information of a camera on a memory 140 and operates wireless transmission with an external terminal device 200. Moreover, manual operating unit 160 controls function according to operating instructions when adjusted. Said control unit 170 is practically a CPU which operates as a main controller of a black box 100.

The present invention increases user convenience through installing more of memory interface (not shown in the drawing) to store information of memory 140 stored crash vehicle in a USB memory like a memory card.

Figure 2:
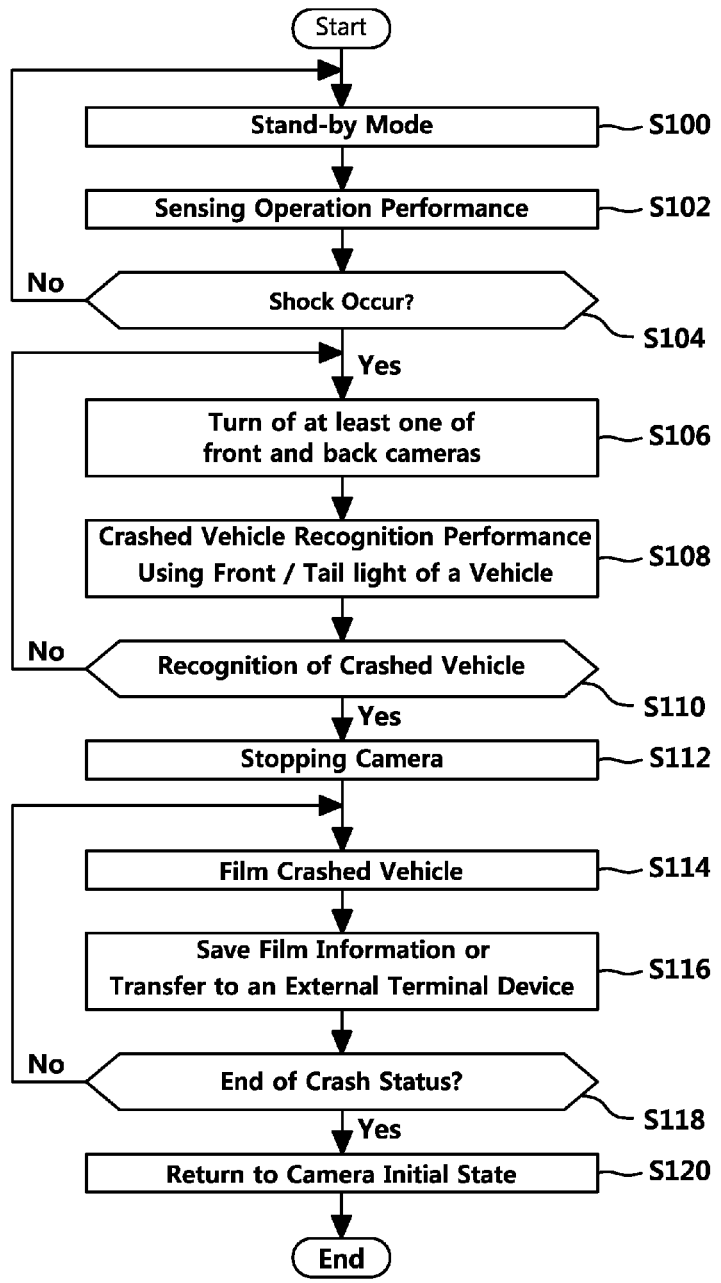
FIG. 2 is a flow chart illustrating a shock sensing control method according to the embodiment of the present invention.

Hereinafter, explains operation of shock sensing control device for vehicle according to the present invention. FIG. 2 is a flow chart illustrating a shock sensing control method for vehicle according to the embodiment.

Herein, process of sensing crash vehicle and recording information will be explained categorized into parked and stopped vehicle in day and night respectively.

First is an example of a crash occurred of a parked and stopped vehicle in night time.

In night time, mostly at night may be dark around a vehicle or light maybe partially provided from a streetlight or parking light. Moreover, headlights are on during night-time driving.

In this condition, when vehicle is parked or stopped, black box 100 is constantly provided with power supplied from a battery of a vehicle and maintains standby mode of no operation s100.

At standby mode, a crash sensing sensor 110 operates constant sensing of crash occurrence at a vehicle s102. If crash does not occur at a vehicle according to said sensing operation, a black box would continue to maintain aforementioned standby mode and the standby mode is continued until a driver starts vehicle engine or unlocks the standby mode.

On the other hand, shock sensing signal is generated when a shock sensing sensor 110 senses crash occurrence or shock of over predetermined reference value s104. A shock sensing sensor can sense shaking of a vehicle due to crash or shock on a vehicle although only one shock sensing sensor is installed in a vehicle. In this case, a shock sensing sensor 110 divides crash unit of a vehicle by front, center and back and outputs shock sensing signal regarding which unit of a vehicle is shocked. This is possible because crash occurred part has a severest shaking. Obviously, a plurality of shock sensing sensor 110 can be installed in a vehicle and detect shock sensing ability in detail. In this case, crash sensing intensity of a crash sensing sensor 110 wherein installed in a crash occurred unit is biggest thereby judgment of what unit of vehicle crash or shock occurred would be easy.

Likewise, when a crash sensing sensor 110 generates crash sensing signal, the crash sensing signal will be transmitted to a control unit 170. Thereby, a control unit 170 will operate to rotate at least one of front and back cameras according to shock sensing signal. In other words, a control unit 170 analyzes a shock sensing signal transmitted by a shock sensing sensor 110 and figures which part of front, center and back of a vehicle crash occurred. Accordingly, front camera is rotated when crash occurs in front of a vehicle, and back camera is rotated when crash occurs in back of a vehicle, and front and back camera are all rotated when crash occurs in center of a vehicle. Rotating of the camera 120 is operated by a control unit 170 controlling drive motor 122.

Thereby, at least one of front and back cameras start to rotate. Herein, a camera 120 not only rotates but also films from a point where a camera starts rotating and to a front region of a camera 120. Moreover, such filmed information is continuously transmitted to an image processing unit 130.

An image processing unit 130 conducts a process of recognizing crash vehicle based on information filmed by a camera 120 according to a shock recognition algorithm 132 s108. The recognition process uses information of a headlight and taillight of a vehicle. In other words, an image processing unit determines detection of image information relating to a red RGB value of a headlight or a tail light of a vehicle while checking image information transmitted from a camera 120. According to the determination, when image information relating to RGB value of a vehicle headlight or a red color RGB value of a vehicle tail light is detected, the result value is transmitted to a control unit 170.

Thereby, a control unit 170 determines that a shock in other words a crash vehicle is detected as cause of vehicle crash s110 and orders a camera 120 to stop to record the crash vehicle s112. A control unit 170 herein, promptly after image information relating to the aforementioned RGB value is detected a camera does not stop rotating but after a camera rotates to a range information of crash vehicle is collected enough, a camera stops rotating. A stop point of a camera 120 for example can rotate until when a RGB value of a vehicle headlight is detected the RGB value is positioned at a median value. On the other hand, a camera can rotate until a license plate of a vehicle is in view. This is because crash vehicle caused a crash in contact with a driver's vehicle but tried to isolate from the driver's vehicle immediately by forwarding or reversing the vehicle. For example, in a case of a hit-and-run vehicle, the vehicle driver tried to run away from the scene right away after a crash and even if it is a minor collision, crash vehicle driver tried to reverse the vehicle to check a crash level. In this case, most of a license plate of a crash vehicle is in a filming range of a camera. On the other hand, a control unit 170 obtains a RGB value of an aforementioned headlight or a red color RGB value of a vehicle tail light in case a crash occurs, whether a crash vehicle is occurred by a forwarding vehicle or a reversing vehicle can be known. Likewise, when crash direction is recognized, and if crash occurs by a hit-and-run vehicle, crash unit of the hit-and-run vehicle can be easily known thereby, can be used as an evidence to find a hit-and-run vehicle with image information of the embodiment of the present invention.

On the other hand, a control unit 170 starts to store image when a camera 120 stops rotating s114. A camera 120 herein, maintains stop condition and records image of a crash vehicle or after stopping a camera 120 rotates again and films an image of a crash vehicle. When a camera 120 rotates again is when a camera 120 image has not film enough of a crash vehicle.

A control unit 170 stores the recorded image in a memory 140 or transmits to an external terminal device 200 through a communication unit 150 s116. An image information stored in a memory 140 herein is information of a video clip or stop image or a compressed information of both. Moreover, image information transmitted to an external terminal device 200 is transmitted in a record complete state or transmitted as image is recorded.

Afterwards, according to a determination result of step 118, when crash situation ends, a control unit 170 returns a camera 120 to an initial state s120.

In step 104, a shock sensing sensor 110 senses shock and a camera films image information as it rotates but even when a crash vehicle is not in view a control unit 170 returns a camera 120 to an initial state.

Likewise, the embodiment of the present invention obtains information of the crash vehicle through a headlight or a tail light of the crash vehicle when a crash vehicle crashes a parked or a stopped vehicle at night.

Second is an example a crash occurred of a parked and stopped vehicle at day. This case is not shown in the drawing since similar in unit with a flow chart of aforementioned flow chart of nighttime. In other words, as illustrated in FIG. 2, maintains a standby mode s100 and, a shock sensing sensor 110 detects crash s102. Moreover, a shock sensing sensor 110 detects crash occurred or shock of over predetermined reference value on a vehicle, a shock sensing signal is transmitted to a control unit 170 s104. Also in this case, which unit is crashed can be known according to a sensing result of a crash sensing sensor 110. A control unit 170 rotates at least one of front and back camera s106 and performs a process of recognizing crash vehicle by filming image information.

There is a slight difference of recognition of crash vehicle between day time and night time using headlight or tail light of a vehicle. In other words, most cars drive with headlights off in daytime. Accordingly, another example should be applied in daytime.

As an example, vehicle and distance information input in a camera 120 is a basis in daytime. In other words, when crash is detected, a camera 120 rotates and rotating route information is filmed. Moreover, vehicle image is recognized among filmed information and when the recognized vehicle is in contact with own vehicle or in a near position (for example within 2~3 m), relevant vehicle is determined as a crash caused vehicle.

According to determination result, a control unit 170 stops a camera 120 as illustrated in FIG. 2 and records relevant vehicle s114. A camera herein, records in a stop condition or while rotating again. Such recorded image information is stored in a memory 140 as aforementioned in a nighttime situation or transmitted to an external terminal device 200 through a communication unit 150 s116.

Afterwards, when crash situation ends, a control unit 170 returns a camera 120 to an initial state s118~s120. A control unit 170 herein, returns a camera 120 to an initial state even when a crash vehicle is unrecognized.

Likewise, process when crash occurred during day time differs only with an algorithm of recognizing crash vehicle in night time and all other process is conducted identically.

Said example illustrates process of detecting and recording shock of a parked and stopped vehicle with no driver on board.

On the other hand, crash accident can occur when a driver is in a vehicle. Even in this case, basically a control unit 170 automatically rotates a camera 120 and recognizes a crash vehicle and conducts a recording process of the crash vehicle image.

However, herein, a driver or a passenger can record and rotate a camera 120 manually to accurately recognize crash vehicle. For example, when vehicle crash occurs, a driver or a passenger can adjust manual operating unit 160 button of a black box. Since a black box button comprises button for rotate/stop/film/return of a camera, rotates a camera 120 to a direction where crash actually occurred by pressing rotate button and stops rotation of a camera by pressing stop button. Moreover, crash vehicle is recorded by pressing a filming button. Recorded information herein is stored in a memory 140 or automatically transmitted to an external terminal device 200. Moreover, when process ends, a camera is returned to an initial state by pressing return button. If it is a one-touch button, button operating conducts operation consecutive order of rotate/stop/film/return.

As explained above, the present invention discloses a feature recording image information of a recognized vehicle when a parked and stopped vehicle is shocked by another vehicle and stores the image information in a storage medium and transmits to an external terminal device thereby actively handling crash accident of a parked and stopped vehicle is possible.

The preferred embodiments of the invention have been explained so far. A person skilled in the art will understand that the invention may be implemented in modifications without deuniting from the basic characteristics of the invention. Accordingly, the foregoing exemplary embodiments and advantages are merely exemplary and are not to be construed as limiting the present invention. The present teaching can be readily applied to other types of apparatuses. Also, the description of the exemplary embodiments of the present inventive concept is intended to be illustrative, and not to limit the scope of the claims.

What is claimed is:

1. A shock sensing controlling device for a vehicle comprising:
   a plurality of shock sensing sensors installed in a vehicle;
   at least one camera rotating to a predetermined direction when a shock sensing signal is generated from the shock sensing sensors;
   an image processing unit recognizing front and back direction of a crashed vehicle and crash point where a crash occurred based on image information collected from the rotating camera, the crash point is divided into front, center and back of the crashed vehicle according to the shock sensing sensor which outputs the shock sensing signal;
   a manual operating unit which films image information of an other crashed vehicle with a direct button input;
   a control unit sensing filming direction of the camera and stopping the camera when the camera's filming direction is directed and controls to store image information regarding crash vehicle, the control unit controls the at least one camera to rotate according to the crash point, and
   a communication unit transmitting image information relating to the crashed vehicle filmed by the at least one camera;
   wherein image information collected from the camera includes information of RGB value corresponding with brightness of a front light of the vehicle or RGB value corresponding with a red color of a tail light of the vehicle, the image processing unit determines the crash point and front and back direction of the crashed vehicle using the information of RGB value corresponding with brightness of the front light of a vehicle or the RGB value corresponding with the red color of the tail light of the vehicle.

2. A shock sensing control method for vehicle comprising:
   a camera rotating step of a control unit rotating at least one camera installed in a vehicle when a vehicle crash is detected;
   a recognition step of recognizing image information collected from the rotating camera based on a crash point wherein crash occurred;
   a recording step of the control unit stopping the camera rotating with a direct button input and filming an other crashed vehicle when the crash point is recognized and,
   a transmitting step of transmitting image information recorded or filmed with the camera to an external terminal device through a communication unit,
   wherein the recognition step detecting a RGB value which corresponds with a front light or a tail light of the crash vehicle at night and wherein the recognition step determines front and back direction of the crashed vehicle according to the RGB value and recognizes the crashed vehicle as a forwarding vehicle when the RGB value of a head light is detected and recognizes the crashed vehicle as a reversing vehicle when the RGB value of a tail light is detected and the recording step stores an image filmed until the detected RGB value is not detected anymore when the head light or the tail light is detected.

* * * * *